Dec. 12, 1967     G. R. SHELLEY ET AL     3,357,760
STORING AND DISH DISPENSING APPARATUS
Filed Jan. 24, 1966
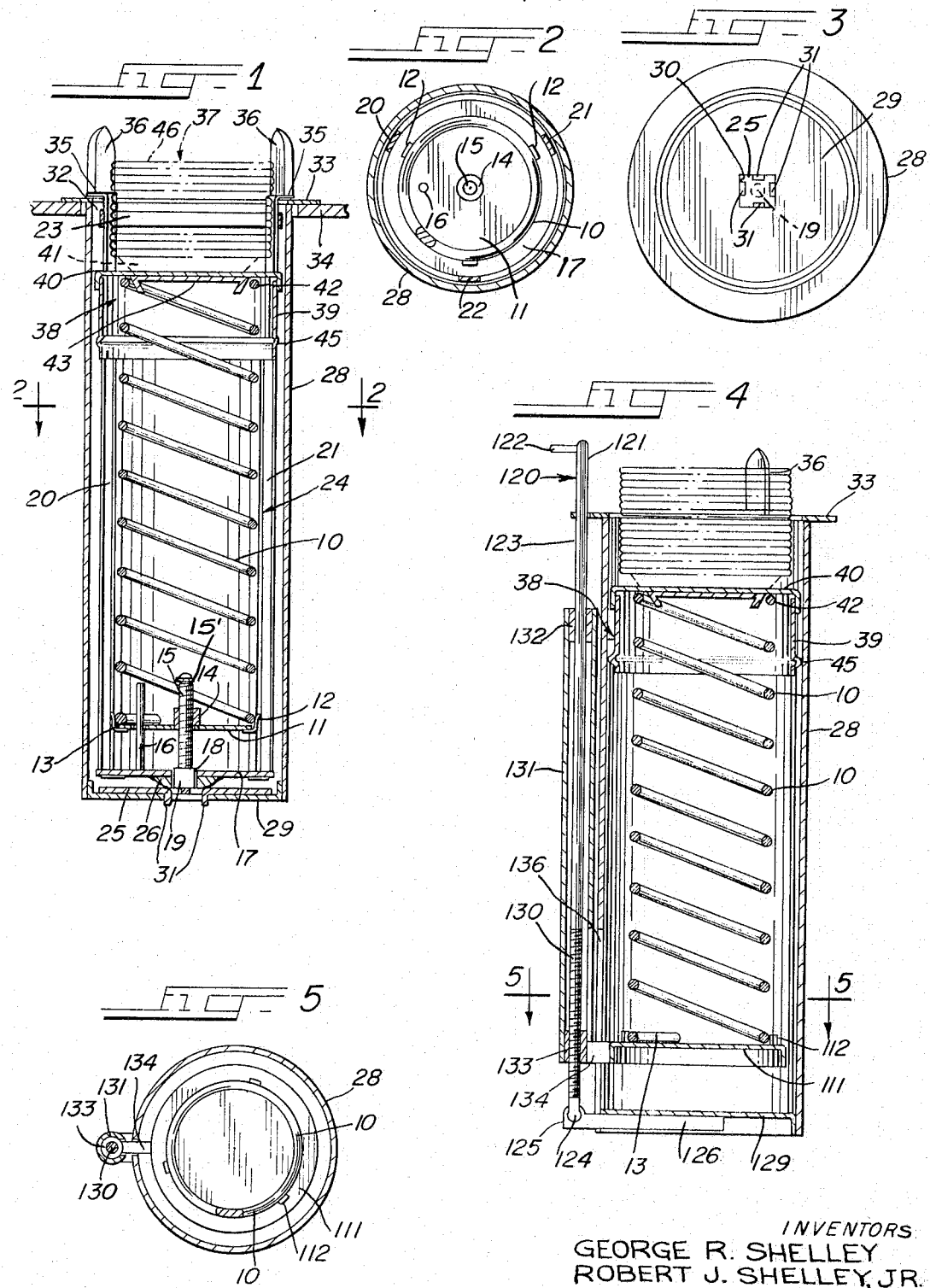
INVENTORS
GEORGE R. SHELLEY
ROBERT J. SHELLEY, JR.
BY
ATTY United States Patent Office 3,357,760
Patented Dec. 12, 1967

3,357,760
STORING AND DISH DISPENSING APPARATUS
George R. Shelley, 9630 Red Road 33126, and Robert J. Shelley, Jr., 5900 SW. 113th St. 33156, both of Miami, Fla.
Filed Jan. 24, 1966, Ser. No. 522,768
5 Claims. (Cl. 312—71)

ABSTRACT OF THE DISCLOSURE

An open-topped tubular member having spring means for urging a stack of dishes above said top into manual dispensing position and adjustment means for setting the tension of said spring means to maintain the topmost dish at any desired level above said top. Associated with the adjustment means is operating means extending above said top which may be manipulated at all times without removing the stack of dishes or moving the tubular member itself.

---

The present invention relates to a self-leveling upwardly opening magazine-type dish dispenser having an upwardly biased dish support assembly for maintaining the uppermost of a dish stack at a constantly elevated position to facilitate manual dish removal.

Tubular devices of the instant class have been known and heretofore used in hospitals, hotels, cafeterias, restaurants, and like places. Characteristically, a device of said class comprises a helical compression spring which is arranged within a tubular housing in a manner such that an upward spring pressure or torsion is applied to a dish carrier to counterbalance a thereon supported dish stack to cause the uppermost thereof to be available through an upper tubular dispensing opening at a constant or pre-selected level. In prior devices, means are provided for vertically adjusting the dish carriers to the end that stacks of dishes of varying weights can be accommodated to bring the uppermost in each such stack to a pre-determined level, or to change the level at which the uppermost of a stack of dishes of given weights will be delivered. However, to adjust the prior devices, it is required that all dishes be removed therefrom. That is to say, no vertical adjustment of a prior dish carrier can be made while it is dish laden. Such characteristic may needlessly increase operational expense for most effective dispenser use when considered in the light of the present disclosure.

The latter is of significance when considered within the framework of varying conditions in which a dispenser may be employed. That is to say, for example, when a dispenser is employed for dishes being removed in rapid succession, as from a crowded cafeteria lunch line, it is desirable that the upper level of the dish stack be elevated above the normal upper dispenser tube opening to minimize structural impediment to dish manipulation. On the other hand, when dish use requirements are such that the interval of removal of successive dishes is of relatively great duration, the entire dish stack may be disposed within the dispenser tube which is generally provided with means for heating the dishes, thereby maintaining the dishes in a warmed condition while awaiting removal. Economic considerations may preclude adjustment of conventional devices to raise and lower the level of their dish carriers to provide ideal conditioning for stacks of dishes because of the time requirements for stack removal to permit adjustment.

In accordance with the present invention and as a principal object thereof, there is provided an improved dish dispensing apparatus of the described class.

It is another object of the present invention to provide in such dish dispensing apparatus means for vertical adjustment of its dish carrier while a dish stack is held in dispensable position.

It is a further object of the present invention to provide in such means for vertical adjustment of the dish carrier a mechanism which is operable manually from above the tube defining the housing of said dish dispensing apparatus whereby the dish carrier can be conditioned to various levels while there is mounted thereon a given dish stack.

It is an additional object of the present invention to provide manually operable means adjustable from above a stack of dishes supported by a dish dispensing apparatus of the described class, said manually operable means adapted to adjust the stack of dishes while mounted in said apparatus to condition the uppermost over a range of levels within and without the tubular housing defining said apparatus.

With the foregoing and other objects in view which will appear as the description proceeds, the invention comprises briefly an open-topped elongated tubular body having positioned therein a compression spring which is supported on a bottom plate and which in turn supports a reciprocable top plate. The top plate is adapted to support thereon a stack of dishes so that the same protrudes above said open top into manual dispensing position. Screw means extending longitudinally of the body cooperates with the bottom plate for raising or lowering the same to adjust the tension on the spring for maintaining the top dish at any given level. The screw means can be readily activated at all times by manipulating an operating extension which extends above the open top. In one embodiment of the invention, the screw means extends up through the spring and the operating extension is connected to a rotatable plate which is in turn keyed to the lower plate. In a second embodiment, the screw is positioned outside of and alongside the tubular body and is connected to an extension of the lower plate which extends through a slot formed in the body wall.

The foregoing and other objects, features and advantages of the present invention will become more apparent upon consideration of the following description and appended claims, when considered in conjunction with the accompanying drawings where the same reference character or numeral refers to like or corresponding parts throughout the several views.

In the drawings:

FIG. 1 is a vertical sectional view of one embodiment of the present invention mounted for operation with only portions of the suspending surface being shown for the purpose of illustration.

FIG. 2 is a horizontal sectional view of said embodiment, taken substantially on the line 2—2 of FIG. 1 and looking in the direction of the arrows.

FIG. 3 is a view of said embodiment looking upwardly from the bottom of FIG. 1.

FIG. 4 is a vertical sectional view of a modified embodiment of the invention.

FIG. 5 is a horizontal sectional view taken substantially on the line 5—5 of FIG. 4 and looking in the direction of the arrows.

Referring now more particularly to the drawings, it is seen that the embodiment illustrated in FIGS. 1, 2 and 3 comprises a coiled compression spring 10 the convolutions of which are generated about an axis adapted to be vertically disposed. A spring support member 11 which is shown arranged in a substantially horizontal plane provides a seat to support said spring from below. In the embodiment of the invention illustrated in FIG. 1 upstanding peripherally spaced clips 12 are rigidly secured to the peripheral portion of said spring support member 11 and provide a retainer for the lowermost spring convolution 13 of the spring 10.

The spring support member 11 comprises a disk or plate having a vertical hub extension or nut 14 which is internally threaded to operably receive a vertical screw 15 which projects through said spring support member. By rotating the spring support member 11 in one direction (counterclockwise with respect to FIG. 2), said spring support member will be elevated, causing the spring 10 to rise. Rotation in an opposite direction will lower said spring support member, and, accordingly, said spring will fall as its support yields. A spring clip retainer 15' prevents the nut 14 from unthreading.

The means by which the spring support member 11 is rotated comprises an eccentrically disposed vertical torque transmission rod 16 longitudinally of which said spring support member is adjustable. Said rod projects upwardly through an eccentric aperture in said spring support member from a rotatable plate 17 to which the lower end of said rod is rigidly secured. The plate 17 is disposed parallel and below the spring support member 11 and as illustrated in FIG. 1, has a central aperture 18 which is in co-axial alignment with the bore or aperture in the hub extension 14. A relatively fixed screw mount 19 which serves as a bushing with which the lower end of screw 15 is rigid is disposed in said aperture 18 and defines an axis member about which the plate 17 is rotatable.

To rotate the plate 17, there are provided, in the embodiment of the invention illustrated in FIGS. 1, 2 and 3, a plurality of vertical rigid bands or strips 20, 21 and 22, the lower ends of which are rigidly secured in any suitable manner to a peripheral portion of the plate 17 from which said bands or strips project upwardly, and are securely tied together in their spaced relation adjacent their upper ends by an annular tie member 23. The diameter of the spring support member 11 is less than the corresponding dimension of the plate 17, whereby the peripheral portion of said plate extends beyond the periphery of said spring support. By spacing the bands or strips 20, 21 and 22 in a cylindrical plane concentric with the spring support member 11, a cage-like structure generally designated as 24 is formed and within which said spring support member 11 is gyratory.

The screw mount 19 is rigidly secured to a plate 25 from which said screw mount normally projects upwardly, the plate 17 being superposed and substantially parallel to the plate 25. As illustrated in FIG. 1, an anti-friction bearing member 26 which may be constrained for rotation with plate 17 is arranged about the screw mount 19 and serves as a spacer between the plate 17 and plate 25.

The cage 24 is adapted to be removably mounted in a tubular or cylindrical housing 28 which is adapted to be vertically disposed and defines the dispensing apparatus. The housing has a centrally apertured floor 29 and an upper opening 32 through which the cage 24 and the spring 10 may be inserted and removed. As illustrated in FIG. 3, the central aperture 30 in the floor 29 may be of rectangular configuration and adapted for reception of a plurality of quadrangularly arranged lugs 31 which are downwardly struck from a central part of the plate 25, whereby said last mentioned plate may be immobilized relative to and against the upper surface of the floor 29. Such arrangement, of course, immobilizes the screw 15 relative to the housing 28, and permits rotation of the plate 17 about said screw mount 19 in fixed spaced relationship relative to the plate 25 and the housing floor 29.

The normally upper limit of the housing 28 comprises an annular flange 33 which extends normally from said housing to define the upper housing opening 32. Said flange may serve to suspend said housing together with the therein contained cage 24 and spring 10 from an apertured suspending flat or table top 34, only a portion of which is shown in FIG. 1. From within said housing, the upper portions of the bands or strips 20, 21 and 22 project outwardly through the opening 32.

As illustrated in FIG. 1, the upper end portions of the bands or strips 20, 21 and 22 may be bent radially outwardly to provide a plurality of horizontal supports 35 to which are rigidly secured the bases of a plurality of upwardly projected guide bosses or posts 36, respectively. Preferably the bosses or posts 36 are disposed in a cylindrical plane concentric with the vertical axis of the dispenser to provide an upper open ended extension of the cage 24 through which the dispenser is loaded and unloaded.

The dispenser is adapted to support a dish stack 37 both within and without the housing 28, as illustrated in phantom, by means of a dish support assembly 38 which is mounted in the upper end portion of housing 28. Said dish support assembly comprises a tubular portion 39 disposed within the cage 24 about and concentric with the upper end of spring 10 and an upper flat dish carrier 40 adapted for disposition in a horizontal plane to provide a supporting seat for said stack 37.

In each of the present embodiments, the dish carrier 40 directly bears against the top coil 42 of spring 10. A downwardly projected centering boss 43 which is secured to the lower surface of dish carrier 40 is disposed within the ring formed by such top coil 42 to facilitate holding the dish support assembly 38 concentrically within the cage 24. Moreover, facilitating vertical movement of the dish support assembly 38 in concentric alignment within the tube 28 is an outwardly struck integral annular bead 45 which is fashioned in the lower end section of the tubular portion 39 and is adapted to engage the bands or strips 20, 21 and 22 from within cage 24.

The spring 10 which may be calibrated conventionally is adapted to counter-balance one or more articles in a stack supported on the dish carrier 40 in a manner such that the uppermost dish 46 will always be available for dispensing at a preselected level which may be the plane of the flat 34 wherefrom such uppermost dish 46 may be removed from the dispenser by lifting it from the cage extension defined by bosses or posts 36.

It may be desirable, however, to condition the stack 37 in a manner such that the uppermost dish 46 will be disposed at a level other than the plane of the flat 34. To that end, the stack 37 can be raised or lowered by manually applying torque to any of the posts 36 to rotate the cage 24 about the screw mount 19. Thereby, accordingly, the spring support member 11, as well as spring 10 will rise or fall and the height of dish carrier 40 can be selectively controlled.

It is appreciated that during a period when there is a requirement for rapid removal of dishes from the dispenser, the stack likely will be elevated, as illustrated in phantom in FIG. 1. Whereas, during a period when a relatively long interval occurs between removal of successive dishes, the entire stack may be lowered to maintain the dishes warm within the housing 28. Another advantage resulting from the present construction is minimization of points of physical engagement of the peripheral parts of the dishes with the dispenser by reason of the use of bands or strips defining cage 24 thereby to eliminate dish chipping.

A modified form of the invention is seen in FIGS. 4 and 5. Therein is shown an alternative mechanism for manually raising and lowering the dish support assembly 38 from above the cylindrical dispenser housing 28. In such modified form, cage 24 has been omitted and in its place has been substituted an elongated vertical rod 120 which extends through the flange 33. Said rod has an upper section 121 projected above the housing 28 with a handle 122 constrained for rotation with said rod and projecting outwardly normally therefrom. The upper rod section 121 is disposed in substantially the same cylindrical plane as the guide bosses or posts 36 which in this latter embodiment are secured to housing 28.

The lower end section 123 of the rod 120 extends substantially the length of the housing 28, said rod end section 123 being disposed outwardly from said housing and having its lower end portion fashioned as a spherical protuberance 124. An arm 126 which is secured to the under surface of the floor or base 129 of the housing 28 projects horizontally outwardly from the housing 28 and has formed therein at its outer end a socket 125. The socket 125 receives for rotation therein the spherical protuberance 124. Thus the rod 120 will rotate in the direction of effective torque applied to the handle 122.

An elongated vertical tube 131 is disposed adjacent the housing 28 between the flange 33 and the spherical protuberance 124. In an upper end portion of said tube, there is mounted an anti-friction bushing 132, and in an opposite end portion there is rigidly secured a nut-like construction 133 the internal threads of which are operably engaged by a medial threaded portion 130 of the rod 120, as illustrated in FIG. 4. A cantilever 134 which is disposed in a substantially horizontal plane has its outer end rigidly secured to said nut-like construction 133, said cantilever extending from said nut-like construction into the housing 28 through a therein provided vertical slot 136. At its inner end, the cantilever 134 is rigidly secured to or fashioned as a plate member 111 having a downwardly extending flange and provided with the peripheral clips 112, which is the structural equivalent of the spring support member 11 in the form of the invention illustrated in FIGS. 1, 2 and 3.

By reason of the foregoing construction, the plate 111 will be raised and lowered with the nut-like construction 133 which will ride upwardly or downwardly on the threaded portion 130 of the rod 120, depending upon the direction of rotation of said rod. Thereby, the height of a stack of articles may be selectively adjusted relative to housing 28 while such stack is mounted in the dispenser. It will also be noted that by the present structure which permits adjustment without having to remove the dishes from the dispenser, it can be readily observed whether the adjustment being made is the one desired.

As many substitutions or changes could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

1. In a self leveling dish dispenser having an elongated housing with a dispensing opening, a spring support member adjustable longitudinally of and rotatably disposed in said housing, a compression spring carried against said spring support member and having an end extending toward said dispensing opening, a reciprocative dish carrier adapted to hold a stack of dishes in dispensable alignment with said dispensing opening under spring biasing and arranged about said spring for support thereby, conditioning means for adjusting the level of said dish carrier longitudinally of said housing and having extending therefrom an operating extension for rotating said support member projected upwardly beyond a stack of dishes disposed on said dish carrier.

2. A self leveling dispenser as defined in claim 1 in which the conditioning means comprises a screw extending longitudinally of said housing and threaded means constrained for movement with said spring support member and arranged in operable association with said screw whereby upon application of torque to said operating extension said spring support member will move longitudinally of said housing.

3. In a self leveling dish dispenser having an elongated housing with a dispensing opening, a spring support member adjustable longitudinally of and disposed in said housing, a compression spring carried against said spring support member and having an end extending toward said dispensing opening, a reciprocative dish carrier adapted to hold a stack of dishes in dispensable alignment with said dispensing opening under spring biasing and arranged about said spring for support thereby, conditioning means for adjusting the level of said dish carrier longitudinally of said housing and having extending therefrom an operating extension projected upwardly beyond a stack of dishes disposed on said dish carrier, said conditioning means comprising a screw extending longitudinally of said housing and threaded means constrained for movement with said spring support member and arranged in operable association with said screw whereby upon application of torque to said operating extension said spring support member will move longitudinally of said housing, said screw being fixed relative to said housing and projecting axially through said spring support member.

4. In a self leveling dish dispenser having an elongated housing with a dispensing opening, a spring support member adjustable longitudinally of and disposed in said housing, a compression spring carried against said spring support member and having an end extending toward said dispensing opening, a reciprocative dish carrier adapted to hold a stack of dishes in dispensable alignment with said dispensing opening under spring biasing and arranged about said spring for support thereby, conditioning means for adjusting the level of said dish carrier longitudinally of said housing and having extending therefrom an operating extension projected upwardly beyond a stack of dishes disposed on said dish carrier, said conditioning means comprising a screw about which said spring support member is rotatable, a rotatable member connected to said operating extension and arranged for movement concentrically of said screw and about said spring, and a torque transmission member connected to said spring support member for transmission thereto of rotatable member torque whereby said spring will rise and fall in accordance with the direction of rotation of said operating extension.

5. A self-leveling dish dispenser comprising a tubular housing having an upper dispensing opening and an apertured floor; an elongated rotatable member mounted for cylindrical movement within said housing; a first plate removably mounted adjacent said floor; lock members engageable in the aperture of said floor for immobilization of said first plate; a centrally apertured second plate connected to a lower end portion of said rotatable member; screw means fixed to said first plate and projecting upwardly into the cylinder generated by said rotatable member through the aperture in said second plate; a spring support member rotatable about said screw means and superposed relative to said second plate; a torque transmission member connected to said spring support member and constrained for rotation with said rotatable member; a compression spring carried on said spring support member and projecting upwardly therefrom within the cylinder formed by said rotatable member; a reciprocative dish carrier supported by said spring at its upper end to hold a stack of dishes in dispensable alignment with the upper dispensing opening, and manually engageable rotatable member extension means projected upwardly through said upper dispensing opening and adapted for disposition about a stack of dishes held on said dish carrier whereby said extension means is rotatable while the dispenser is dish laden to rotate said rotatable member and adjust the height of said spring support member, spring and dish carrier.

References Cited

UNITED STATES PATENTS

| 399,197 | 3/1889 | Hawkins | 312—71 X |
| 1,773,070 | 8/1930 | Willauer | 312—71 |
| 2,260,563 | 10/1941 | Elliott | 312—36 XR |
| 2,418,113 | 4/1947 | Fletcher | 312—71 |
| 2,435,104 | 1/1948 | Solomon | 312—71 |
| 2,901,306 | 8/7959 | Larsen | 312—71 |
| 2,919,168 | 12/1959 | Shiuek | 312—71 |

BOBBY R. GAY, *Primary Examiner.*

DAVID J. WILLIAMOWSKY, *Examiner.*

J. L. KOHNEN, *Assistant Examiner.*